United States Patent
Jagtap et al.

(10) Patent No.: US 11,608,442 B2
(45) Date of Patent: Mar. 21, 2023

(54) SILANE FUNCTIONALIZED FIBRE BASED COATING COMPOSITION AND A PROCESS OF PREPARATION THEREOF

(71) Applicant: Reliance Industries Limited, Mumbai (IN)

(72) Inventors: Ramanand Namdeo Jagtap, Mumbai (IN); Arun Arora, Mumbai (IN); Gaurav Gupta, Navi Mumbai (IN); Nilesh Shankar Revagade, Kalyan (IN); Nivedita Dnyaneshwar Nandanwar, Nagpur (IN); Prashil Dharmesh Desai, Vadodara (IN)

(73) Assignee: Reliance Industries Limited, Mumbai (IN)

( * ) Notice: Subject to any disclaimer, the term of this patent is extended or adjusted under 35 U.S.C. 154(b) by 413 days.

(21) Appl. No.: 16/757,108

(22) PCT Filed: Oct. 15, 2018

(86) PCT No.: PCT/IB2018/057967
§ 371 (c)(1),
(2) Date: Apr. 17, 2020

(87) PCT Pub. No.: WO2019/077466
PCT Pub. Date: Apr. 25, 2019

(65) Prior Publication Data
US 2020/0239703 A1 Jul. 30, 2020

(30) Foreign Application Priority Data
Oct. 17, 2017 (IN) .............................. 201721036941

(51) Int. Cl.
| | | |
|---|---|---|
| C09D 5/02 | (2006.01) | |
| C09D 7/65 | (2018.01) | |
| C09D 7/40 | (2018.01) | |
| C08G 63/183 | (2006.01) | |
| C08G 63/91 | (2006.01) | |
| C09D 133/08 | (2006.01) | |
| C08L 67/00 | (2006.01) | |

(52) U.S. Cl.
CPC ........... C09D 5/028 (2013.01); C08G 63/183 (2013.01); C08G 63/916 (2013.01); C09D 7/65 (2018.01); C09D 7/70 (2018.01); C09D 133/08 (2013.01); C08L 67/00 (2013.01); C08L 2203/12 (2013.01)

(58) Field of Classification Search
CPC . C09D 5/028; C09D 7/65; C09D 7/70; C09D 133/08; C08L 67/00; C08G 63/183; C08G 63/916
USPC ........................................................ 106/499
See application file for complete search history.

(56) References Cited

U.S. PATENT DOCUMENTS

| | | |
|---|---|---|
| 2014/0314959 A1 | 10/2014 | Scheibel et al. |
| 2015/0337140 A1 | 11/2015 | Romick et al. |

FOREIGN PATENT DOCUMENTS

CN 104804594 A * 7/2015 ........... C09D 163/10

OTHER PUBLICATIONS

Xie et al., Composites: Part A, 41, 806-819, 2010. (Year: 2010).*
Translation of CN 104804594, Jul. 29, 2015. (Year: 2015).*
Xie, Yanjun et al. "Silane coupling agents used for natural 1-18 fiber/polymer composites: A review" (in Composites Part A: Applied Science and Manufacturing, vol. 41A, Issue 7, Published on Jul. 2010 (abstract, description, table 1) (16 pages).
International Search Report issued in International Application No. PCT/IB2018/057967 dated Jan. 11, 2019 (3 pages).
Written Opinion issued in International Application No. PCT/IB2018/057967 dated Jan. 11, 2019 (6 pages).

* cited by examiner

*Primary Examiner* — Hui H Chin
(74) *Attorney, Agent, or Firm* — Osha Bergman Watanabe & Burton LLP

(57) ABSTRACT

The present disclosure envisages a coating composition. The coating composition comprises a polymeric emulsion, silane functionalized fibres and a fluid medium. The silane functionalized fibres are present in an amount in the range of 0.05 wt. % to 10 wt. % of the coating composition. The polymeric emulsion is present in an amount in the range of 20 wt. % to 60 wt. % of the coating composition. The fluid medium is present in an amount in the range of 5 wt. % to 40 wt. % of the coating composition. The silane functionalized fibre comprises at least one polymer bonded to at least one silane group. The coating composition of the present disclosure exhibit improved properties such as better coverage when applied on a surface, mechanical properties, stain resistance properties and the like, when compared to coating composition without fibres.

16 Claims, No Drawings

SILANE FUNCTIONALIZED FIBRE BASED COATING COMPOSITION AND A PROCESS OF PREPARATION THEREOF

FIELD

The present disclosure relates to silane functionalised fibre based coating composition and process for preparation of the coating composition.

Definitions

As used in the present disclosure, the following terms are generally intended to have the meaning as set forth below, except to the extent that the context in which they are used indicate otherwise.

Silane refers to organosilicon compounds, which are used for replacing active hydrogen with silyl group.

Surface modification refers to the act of modifying the surface of a material by bringing physical, chemical or biological characteristics different from the ones originally found on the surface of the material.

Functionalization refers to the process of adding new functions, features, capabilities, or properties to a material by changing the surface chemistry of the material. It is a fundamental technique used throughout chemistry, materials science, biological engineering, textile engineering, and nanotechnology.

Denier refers to a unit of measure for the linear mass density of fibres. Denier is expressed as the mass in grams per 9000 meters of the fibre.

Tracer property refers to optical properties exhibited in the presence of UV light.

Film biocide refers to an additive for protection of dried paint film against fungi, mould, algae and bacteria.

In-can biocide refers to an additive for wet-state protection of paint against fungi, mould and bacteria.

Mildecide or Mildewcide refers to mildew preventative additive for paint.

Polymeric emulsion refers to a dispersion of a polymer in a fluid.

Full dull polyester fibers refer to fibers having high tenacity, strength and aesthetically similar to cotton fiber.

BACKGROUND

The background information herein below relates to the present disclosure but is not necessarily prior art.

There has been a growing interest in the decorative and industrial coating compositions due to their wide applications. It is desirable to have a coating composition with properties such as higher coverage area, high tensile strength, high percentage elongation and the like.

The properties of a coating composition can be improved in a variety of ways. One such method is by incorporating functional fillers in the coating composition, for a uniform distribution and better adhesion.

Fillers such as polymeric fibres can be used to improve the coating properties. However, such fibres have limited dispersing ability when added to a coating composition, owing to their hydrophobic nature.

There is, therefore, felt a need for obtaining a coating composition that overcomes the above mentioned limitations.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a coating composition.

Another object of the present disclosure is to provide a coating composition having improved dispersion of fibres in the coating composition.

Still another object of the present disclosure is to provide a coating composition having improved adhesion.

Other objects and advantages of the present disclosure will be more apparent from the following description, which is not intended to limit the scope of the present disclosure.

SUMMARY

In one aspect, the present disclosure provides a coating composition. The coating composition comprises a polymeric emulsion, silane functionalized fibres and a fluid medium. The silane functionalized fibres are present in an amount in the range of 0.05 wt. % to 10 wt. % of the coating composition. The polymeric emulsion is present in an amount in the range of 20 wt. % to 60 wt. % of the coating composition. The fluid medium is present in an amount in the range of 5 wt. % to 40 wt. % of the coating composition. The silane functionalized fibre comprises at least one type of polymeric fibre bonded to at least one silane group.

The coating composition further comprises at least one additive selected from the group consisting of dispersing agent, coalescing agent, binder, de-foaming agent, filler, thickener, amine additive, mildecide, in-can biocide, film biocide, preservatives, emulsifiers and pigments.

In second aspect, the present disclosure provides a process for preparing a coating composition. The process comprises a first step of homogenizing a mixture of polymeric emulsion and a fluid medium in a mixing vessel to obtain an emulsion.

An aqueous dispersion of silane functionalized fibres is added to the emulsion, followed by homogenizing to obtain a coating composition.

DETAILED DESCRIPTION

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

The properties of coating compositions are improved by incorporation of various additives to the composition. The additives inculcate properties such as improved resistance to stain, wet and dry scrub resistance, improved wettability and the like. One such additive includes polymeric fibres which are added to coatings to improve the mechanical properties of the coatings.

However, dispersing the fibres in the composition is difficult as the fibres tend to form lumps by aggregation and settle down thereby negatively affecting the characteristics of the composition. The aggregation issue can be attributed mainly to the hydrophobic nature of the fibres. In some cases, it also leads to abrupt change in viscosity of the composition.

The present disclosure envisages a coating composition comprising silane functionalized fibres. The hydrophilic nature of the fibers enables uniform dispersion of fibres in the composition and increases the hydrophilcity of the overall composition, thereby leading to better coverage on surface and enhancement of other significant properties.

In one aspect, the present disclosure provides a coating composition. The coating composition comprises a polymeric emulsion, silane functionalized fibres and a fluid medium.

The silane functionalized fibres are present in an amount in the range of 0.05 wt. % to 10 wt. % of the coating composition. In an embodiment, the silane functionalized fibres are present in an amount in the range of 3 wt. % of the coating composition.

The fluid medium is present in an amount in the range of 5 wt. % to 40 wt. % of the coating composition.

The fluid medium is at least one selected from the group consisting of water and organic fluid media. In an embodiment, the fluid medium is water.

The polymeric emulsion is present in an amount in the range of 20 wt. % to 60 wt. % of the coating composition. Preferably, the polymeric emulsion is present in an amount in the range of 20 wt. % to 40 wt. %. In an embodiment, the amount of the polymeric emulsion is 36 wt. %.

In an embodiment, the polymeric emulsion is a water based system.

The polymeric emulsion comprises at least one polymer selected from the group consisting of vinyl polymer, vinyl copolymer, semi vinyl polymer, acrylic polymer, semi acrylic polymer, water reducible epoxies, alkyds, polyesters, silicons, polyurethane, synthetic rubber, and natural rubber.

The polymeric emulsion further includes, but is not limited to, acrylic monomers, methacrylic monomers, styrene monomers, vinyl acetate, fatty acids, oils, silane compound, alkyd emulsion, epoxy emulsion, polyurethane dispersion, silicon emulsion, hybrids, emulsifiers, buffers, and the like.

In an embodiment, the polymeric emulsion comprises co-monomer units of methyl methacrylate and acrylic acid.

In an embodiment, the polymeric emulsion comprises acrylic polymer. In another embodiment, the polymeric emulsion comprises semi acrylic polymer.

In accordance with the present disclosure, the silane functionalized fibre comprises at least one type of polymeric fibre bonded to at least one silane group.

The polymeric fibres such as polyester fibres are originally hydrophobic in nature and hence it is difficult to disperse the hydrophobic fibres in a composition as the fibres may aggregate to form lumps.

The silane functionalized fibres of the present disclosure are hydrophilic in nature due to the silylation reaction of the polymeric fiber with the silane. The hydrophilic silane functionalized fibres thus obtained are easier to disperse and give better adhesion in a coating composition.

The silyl groups present on the silane functionalized fibre may also interact with components present in the coating composition such as binder. Thus, due to the hydrophilic nature of the silane functionalized fibres and potential for interaction with the components, these fibres are well dispersed in the coating composition.

Silane is reacted with the polymeric fibres during various stages of fibre preparation such as during the fibre spinning, fibre drawing, before fibre chopping, after fibre chopping, and the like.

Typically, the silane is at least one selected from the group consisting of vinyl silane, epoxy silane, alkoxy silane and amino silane.

In accordance with the present disclosure, the type of polymeric fibre is polyester fibre selected from the group consisting of polyethylene terephthalate (PET), polytrimethylene isophthalate (PTI), polybutylene terephthalate (PBT), polytrimethylene terephthalate (PTT), polytrimethylene napthalate (PTN), polybutylene naphthalate (PBN), and polyethylene naphthalate (PEN).

In an embodiment, the type of polymeric fibre is polyethylene terephthalate (PET).

Typically, the polymeric fibres are polyester fibres selected from the group consisting of virgin fibres, recycled fibres, colored fibres, optical bright fibres, full dull fibres, hybrid fibres, hollow fibres and super-bright fibres.

In accordance with the present disclosure, the amount of silane in the silane functionalized fibre is in the range of 0.01 wt. % to 5 wt. %.

The cut length of the silane functionalized fibre is in the range of 0.1 mm to 6 mm.

The linear mass density of the silane functionalized fibre is in the range of 0.5 denier to 15 denier.

In accordance with the present disclosure, the silane functionalized fibre is a hydrophilic fibre.

The coating composition further comprises at least one additive selected from the group consisting of dispersing agent, coalescing agent, binder, de-foaming agent, filler, thickener, amine additive, mildecide, in-can biocide, film biocide, preservatives, emulsifiers and pigments.

Typically, the coalescing agent is selected from the group consisting of butyl cellosolve, 2,2,4-Trimethyl-1,3-pentanediol monoisobutyrate, kerosene and pine oil. In an embodiment, the coalescing agent is 2,2,4-Trimethyl-1,3-pentanediol monoisobutyrate.

Typically, the amine additive is selected from the group consisting of ammonia, sodium hydroxide, potassium hydroxide and 2-Amino-2-methyl-1-propanol. In an embodiment, the amine additive is 2-Amino-2-methyl-1-propanol. In an embodiment, the coating composition comprises a binder selected from the group consisting of alkyds, epoxy, acrylic, polyurethane and silicon based.

Typically, the amount of the binder in the coating composition is in the range of 10 wt % to 40 wt % with respect to the total weight of the composition.

Typically, the de-foaming agent is selected from the group consisting of wax dispersion in mineral oil and silicon defoamer emulsion. In an embodiment, the de-foaming agent is wax dispersion in mineral oil. Typically, the in-can biocide is at least one compound selected from the group consisting of methylchloroisothiazolinone, methylisothiazolinone, and benzisothiazolinone. In an embodiment, the in-can biocide is a mixture of methylchloroisothiazolinone, methylisothiazolinone, and benzisothiazolinone.

Typically, the film biocide is at least one compound selected from the group consisting of diuron, carbendizm, metal pyrithones, iodopropynyl butyl carbamates and silver based compound. In an embodiment, the film biocide is a mixture of diuron and carbendizm.

In an embodiment, the coating composition comprises a dispersing agent selected from the group consisting of fluorinated polyacrylates, alkylphenol ethoxylates, quaternary ammonium compound and alkyl polyglycol ether carboxylate.

Typically, the amount of the dispersing agent in the coating composition is in the range of 0.2 wt % to 10 wt % with respect to the total weight of the composition.

Typically, the preservatives include, but are not limited to, in-can stabilizers or dry film preservatives.

Typically, the emulsifiers are any of anionic or non-anionic emulsifiers.

Typically, the pigment is any compound selected from the group consisting of organic pigments, inorganic pigments, polymeric pigments, interference pigments, lake pigments, dyes and extenders.

The silane functionalized fibres are anisotropically oriented in the coating composition, which enable them to develop a network structure, which in turn is responsible for the enhancement in the viscosity of the coating composition. In an embodiment, additional amount of the fluid medium is added to adjust the viscosity of the coating composition.

In an embodiment, the coating composition of the present disclosure is used as an architectural paint. Upon application to a wall surface, the fibres present in the coating composition of the present disclosure deposit in the debris on the surface, thereby resulting in a leveling effect on the surface, and imparting more whiteness to the coated surface.

In an embodiment, the coverage (spread rate) of the coating composition of the present disclosure is found to be higher by 15% as compared to the coating composition without the silane functionalized fibres.

In an embodiment, the silane functionalized fibres comprises tracer property wherein it displays optical properties upon exposure to UV light. Such fibres, when added in the composition, enable anti-counterfeiting applications.

In another aspect, the present disclosure provides a process for preparing the coating composition. The process comprises a step of homogenizing a mixture of polymeric emulsion and a fluid medium in a mixing vessel to obtain an emulsion. An aqueous dispersion of silane functionalized fibres is added to the emulsion, followed by homogenizing to obtain a coating composition.

In an embodiment, the mixing vessel is cowl disc mixing vessel.

In an embodiment, the process further comprises adding prior to the first step, at least one additive selected from the group consisting of dispersing agent, coalescing agent, binder, de-foaming agent, filler, thickener, amine additive, mildecide, in-can biocide, film biocide, preservatives, emulsifiers and pigments.

In one embodiment, the silane functionalized fibres are added in dry form. In another embodiment, the aqueous dispersion of silane functionalized fibres is prepared by soaking the silane functionalized fibres in water.

In an embodiment, the coating composition of the present disclosure is used for at least one application selected from the group consisting of interior paint, exterior paint, dry powder paint, putty, jointing compound, sealer, water proofing compound, stiff paints, water-based, solvent based and solvent free paints.

The coating composition of the present disclosure exhibits improved coating properties such as better coverage, tensile strength, abrasion and scratch resistance, whiteness index and stain resistance.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

Experimental Details

The viscosity was measured with Brookfield viscometer using the standard method ASTM D2196. The tensile strength and elongation were measured with UTM (LOYD LR 50K) using ASTM D638. The pencil hardness was measured using ASTM D3363.

Experiment 1: Preparation of Coating Composition Comprising Silane Functionalized Fibers (Sample 1A)

Water (18.70 g), hydroxy ethyl cellulose (thickener) (0.5 g), 2-Amino-2-methyl-1-propanol as an amine additive (0.2 g), glycol (2.0 g), wax dispersed in mineral oil as de-foaming agent (0.2 g), in can biocide (a mixture of methylchloroisothiazolinone, methylisothiazolinone and benzisothiazolinone) (0.2 g) and film biocide (mixture of diuron and carbendizm) (1.5 g) were mixed under slow speed in cowl disc mixing vessel for 5 minutes to obtain a mixture. $TiO_2$ (pigment) (17.0 g) and calcium carbonate (extender) (20.0 g) were added to the mixture and mixed at high speed in the cowl mixing vessel to obtain a mixture. To this mixture, an acrylic polymeric emulsion (co-monomeric units of methyl methacrylate and acrylic acid) (38.0 g), 2,2,4-Trimethyl-1,3-pentanediol monoisobutyrate as coalescing solvent (1.5 g), wax dispersed in mineral oil as de-foaming agent (0.2 g), silane functionalized fibres having density of 10 denier (0.05 g) and water (0.20 g) were added and homogenized to obtain the coating composition sample 1A.

Experiment 2: Preparation of Coating Composition Comprising Silane Functionalized Fibers (Sample 1B)

The process as given in Experiment 1 was repeated except that 1 g of silane functionalized fibres (having density as 10 denier) and 12.0 g of water were added, to obtain the coating composition sample 1B.

Experiment 3: Preparation of Coating Composition Comprising Silane Functionalized Fibers (Sample 1C)

The process as given in Experiment 1 was repeated except that 3 g of silane functionalized fibres (having density as 10 denier) and 12.0 g of water were added, to obtain the coating composition sample 1C.

Experiment 4: Preparation of Coating Composition Comprising Silane Functionalized Fibers (Sample 1D)

The process as given in Experiment 1 was repeated except that 3.0 g of silane functionalized fibres having density as 0.9 denier and 12.0 g of water were added, to obtain the coating composition sample 1D.

Experiment 5: Preparation of Coating Composition Comprising Silane Functionalized Fibers (Sample 1E)

The process as given in Experiment 1 was repeated except that 3.0 g of silane functionalized fibres having density as 10 denier and 12.0 g of water were added, to obtain the coating composition sample 1E.

Experiment 6: Preparation of Reference Sample [Composition without Silane Functionalized Fibers] (Sample 2)

The process as given in Experiment 1 was repeated except that silane functionalized fibres were not added, to obtain the coating composition sample 2.

The composition of each sample is as summarized in Table 1.

TABLE 1 illustrates the composition of Samples 1A-1E and reference sample 2

| Raw Material | Sample 1A | Sample 1B | Sample 1C | Sample 1D | Sample 1E | Sample 2 |
|---|---|---|---|---|---|---|
| Water | 18.70 | 18.70 | 18.70 | 18.70 | 18.70 | 18.70 |
| Hydroxy ethyl cellulose (Thickener) | 0.50 | 0.50 | 0.50 | 0.50 | 0.50 | 0.50 |
| Amine Additive (pH stabilizer) | 0.20 | 0.20 | 0.20 | 0.20 | 0.20 | 0.20 |
| Glycol | 2.00 | 2.00 | 2.00 | 2.00 | 2.00 | 2.00 |
| Mineral Defoamer | 0.20 | 0.20 | 0.20 | 0.20 | 0.20 | 0.20 |
| In can Biocide | 0.20 | 0.20 | 0.20 | 0.20 | 0.20 | 0.20 |
| Film Biocide | 1.50 | 1.50 | 1.50 | 1.50 | 1.50 | 1.50 |
| $TiO_2$ (Pigment) | 17.00 | 17.00 | 17.00 | 17.00 | 17.00 | 17.00 |
| Calcium Carbonate (Extender) | 20.00 | 20.00 | 20.00 | 20.00 | 20.00 | 20.00 |
| Polymeric Emulsion (Acrylic Polymer) | 38.00 | 38.00 | 38.00 | 38.00 | 38.00 | 38.00 |
| Coalescing Solvent | 1.50 | 1.50 | 1.50 | 1.50 | 1.50 | 1.50 |
| Defoamer | 0.20 | 0.20 | 0.20 | 0.20 | 0.20 | 0.20 |
| Silane Functionalized Fibre | 0.05 | 1.00 | 3.00 | 3.00 | 3.00 | 0.00 |
| Water | 0.20 | 4.00 | 12.00 | 12.00 | 12.00 | 0.00 |
| Total | 100.25 | 105.00 | 115.00 | 115.00 | 115.00 | 100.00 |

The coating composition samples thus obtained, were subjected to various property measurements, as given in Table 2

TABLE 2 illustrates the data related to measurement of properties of Samples 1A-1E and reference sample 2

| Sr. No. | Property | Sample 1A | Sample 1B | Sample 1C | Sample 1D | Sample 1E | Sample 2 |
|---|---|---|---|---|---|---|---|
| 1 | Spread rate (Sq. ft/lit) | 163.00 | 172.00 | 187.00 | 195.00 | 190.00 | 160 |
| 2 | Viscosity (at 25° C.) | 91.00 | 95.00 | 100.00 | 120.00 | 111.00 | 90 |
| 3 | Pencil Hardness | B | HB | F | F | F | B |
| 4 | Elongation percentage | 2.60 | 2.56 | 2.71 | 2.66 | 2.70 | 2.6 |
| 5 | Tensile Strength (N/m) | 91.50 | 96.40 | 104.85 | 100.20 | 101.50 | 90.87 |
| 6 | Whiteness Index | 89.22 | 90.19 | 91.17 | 90.60 | 91.11 | 89.212 |
| 7 | Yellowness Index | 0.88 | 0.20 | −0.73 | −0.77 | −0.74 | 0.946 |
| 8 | Opacity (Contrast Ratio) | 0.92 | 0.93 | 0.94 | 0.93 | 0.93 | 0.92 |
| 11 | Scrub Resistance | 4500 cycles | 4900 cycles | 4900 Cycles | 5200 cycles | 5050 cycles | 4500 cycles |
| 12 | Adhesion (Square cut) | 84% | 90% | 95% | 96% | 95% | 80% |
| 13 | Self-Cleaning/Stain Resistance | R = 6 | R = 7 | R = 9 | R = 9 | R = 9 | R = 6 |
| 14 | Visibility of fibre under UV light | Visible in scratter form with distance of 5-10 mm | Visible in dense form and fibres are well distributed and close to each other @2 mm | Very dense micro web formation | Very dense micro web formation | Very dense micro web formation | Not visible |
| 15 | Surface smoothness after roller application | Smooth | Smooth | Smooth; slight texture feel | Smooth | Smooth | Smooth |

*Note:
Grading R = 1 means low stain resistance, R = 10 means high stain resistance As observed from Table 1, the coating composition of the present disclosure has higher coverage value (spread rate) (about 15% higher) in comparison to the reference sample 2 in which the silane functionalized fibres are not added. Further, other properties such as viscosity, whiteness index and tensile strength are also improved. Moreover, the samples 1A-1E has improved stain resistance as well than reference sample 2.

The coating composition of the present disclosure displays improved properties in comparison to the reference sample. The tensile strength of the coating obtained by using the composition of the present disclosure is much higher in comparison to the reference coating composition. Moreover, the coating displays significant properties such as self-cleaning and light-emitting characteristics, which are not displayed by the reference coating composition. The coating composition is also economical and cost-effective than commercial coating compositions.

Technical Advancements

The present disclosure described herein above has several technical advantages including, but not limited to, the realization of a coating composition, that:
exhibit improved properties such as better coverage on a surface, mechanical properties, whiteness and stain resistance; and
is prepared by simple and economical process.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A coating composition, comprising:
   a polymeric emulsion in an amount in a range of 20 wt. % to 60 wt. % of said coating composition;
   silane functionalized fibres in an amount in a range of 0.05 wt. % to 10 wt. % of said coating composition; and
   a fluid medium in an amount in a range of 5 wt. % to 40 wt. % of said coating composition,
   wherein said silane is at least one selected from the group consisting of vinyl silane, epoxy silane, alkoxy silane and amino silane; and
   wherein an amount of silane in said silane functionalized fibre is in a range of 0.01 wt. % to 5 wt. %.

2. The coating composition as claimed in claim 1, wherein the composition comprises at least one additive selected from the group consisting of dispersing agent, coalescing agent, binder, de-foaming agent, filler, thickener, amine additive, mildecide, in-can biocide, film biocide, preservatives, emulsifiers and pigments.

3. The coating composition as claimed in claim 1, wherein said polymeric emulsion comprises at least one polymer selected from the group consisting of vinyl polymer, vinyl copolymer, semi vinyl polymer, acrylic polymer, semi acrylic polymer, water reducible epoxies, alkyds, polyesters, silicons, polyurethane, synthetic rubber, and natural rubber.

4. The coating composition as claimed in claim 1, wherein said polymeric emulsion comprises acrylic polymer.

5. The coating composition as claimed in claim 1, wherein said fluid medium is at least one selected from the group consisting of water and organic fluid media.

6. The coating composition as claimed in claim 1, wherein said silane functionalized fibre comprises at least one type of polymeric fibre bonded to at least one silane group.

7. The coating composition as claimed in claim 6, wherein said type of polymeric fibre is polyester fibre selected from the group consisting of polyethylene terephthalate (PET), polytrimethylene isophthalate (PTI), polybutylene terephthalate (PBT), polytrimethylene terephthalate (PTT), polytrimethylene naphthalate (PTN), polybutylene naphthalate (PBN) and polyethylene naphthalate (PEN).

8. The coating composition as claimed in claim 6, wherein said type of polymeric fibre is polyethylene terephthalate (PET).

9. The coating composition as claimed in claim 6, wherein the polymeric fibres are polyester fibres selected from the group consisting of virgin fibres, recycled fibres, colored fibres, optical bright fibres, full dull fibres and hybrid fibres.

10. The coating composition as claimed in claim 1, wherein a cut length of said silane functionalized fibre is in a range of 0.1 mm to 6 mm.

11. The coating composition as claimed in claim 1, wherein linear mass density of said silane functionalized fibre is in a range of 0.5 denier to 15 denier.

12. The coating composition as claimed in claim 1, wherein said silane functionalized fibre is a hydrophilic fibre.

13. The coating composition as claimed in claim 1, wherein said silane functionalized fibre comprises tracer property.

14. A process for preparing a coating composition, said process comprising the following steps:
   i. homogenizing a mixture of polymeric emulsion and a fluid medium in a mixing vessel to obtain an emulsion; and
   ii. adding an aqueous dispersion of silane functionalized fibres to the emulsion, followed by homogenizing to obtain a coating composition.

15. The process as claimed in claim 14, wherein said process comprises adding prior to step (i), at least one additive selected from the group consisting of dispersing agent, coalescing agent, binder, de-foaming agent, filler, thickener, amine additive, mildecide, in-can biocide, film biocide, preservatives, emulsifiers and pigments.

16. The process as claimed in claim 14, wherein said aqueous dispersion of silane functionalized fibres is prepared by soaking said silane functionalized fibres in water.

\* \* \* \* \*